Jan. 14, 1969     R. P. KOSS     3,421,563
FASTENER ASSEMBLY
Filed July 31, 1967
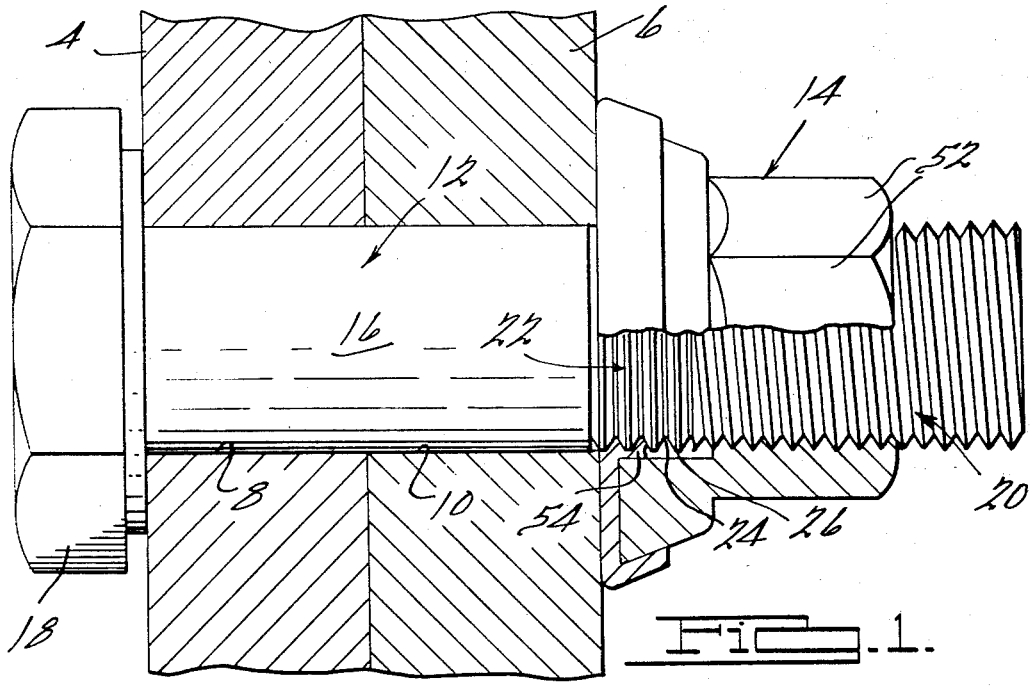
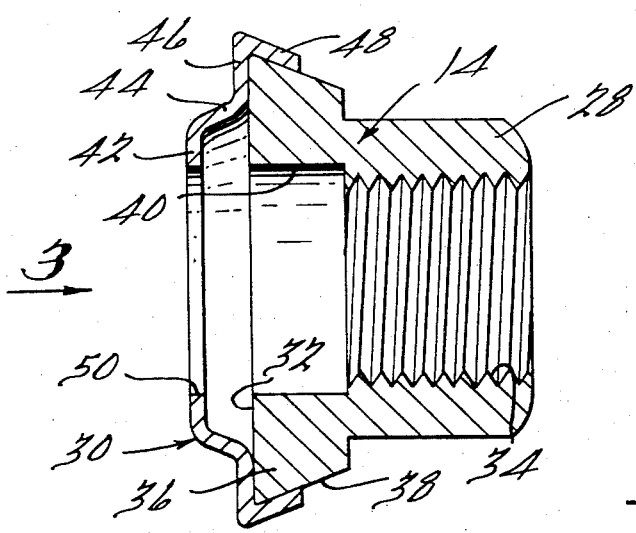
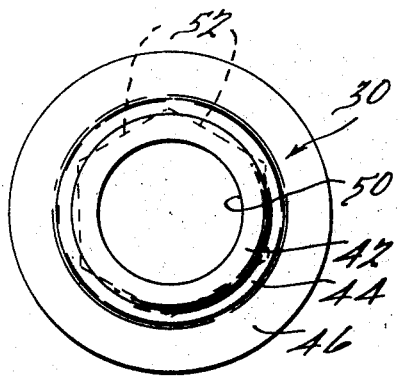
INVENTOR.
Richard P. Koss
BY
Harness, Dickey + Pierce
ATTORNEYS.

United States Patent Office 3,421,563
Patented Jan. 14, 1969

3,421,563
FASTENER ASSEMBLY
Richard P. Koss, Taylor Mich., assignor to Federal Screw Works, Detroit, Mich., a corporation of Michigan
Filed July 31, 1967, Ser. No. 657,134
U.S. Cl. 151—7          6 Claims
Int. Cl. F16b 39/24; F16b 31/02

ABSTRACT OF THE DISCLOSURE

A fastener assembly consisting of a male member having a threaded section and a textured locking section along its shank and a nut assembly comprising a body having a threaded bore and a dish-shaped deformable washer mounted thereon. The washer is provided with an aperture therethrough which, upon deformation thereof in response to the tightening of the nut assembly, effects a firm interlocking engagement with the locking section and prevents inadvertent axial movement of the nut assembly along the male member.

Background of the invention

Various lock nuts and lock washers have heretofore been used or proposed for use to prevent inadvertent loosening of a fastener assembly due to shock loading or vibrations imposed thereon during use. Difficulties have been encountered in high speed assembly operations employing lock washers of the conventional types heretofore known. In some instances improper installation of the lock washer has resulted in a less optimum locking action whereas in other instances the individual handling of lock washers and nuts has occasioned inadvertent omission of a lock washer in which case no locking action is provided at all. In addition to the added manipulative steps necessary in handling an individual lock washer and nut, it is generally difficult to ascertain by visual inspection whether the nut and lock washer assembly has been properly tightened.

The foregoing and other disadvantages of fastener locking devices of the types heretofore known are overcome in accordance with the fastening assembly comprising the present invention in which the lock washer and nut consists of a preassembled unit substantially facilitating handling and installation and assuring that the lock washer is properly installed each time on a male threaded member such as a bolt or stud which is appropriately tensioned during a tightening of the nut and a deformation of the lock washer into firm locking engagement thereon.

Summary of the invention

The foregoing and other advantages of the present invention are achieved by a fastener assembly consisting of a male member having a shank provided with a threaded section adjacent to one end thereof and an engaging section of a textured surface extending axially along a portion of the shank adjacent to the threaded section. A nut assembly, consisting of a body having a seat or face, is provided with a threaded bore extending axially therethrough which is adapted to be threadably engaged on the threaded section of the male member. The body is formed with a shoulder or flange and a dish-shaped washer disposed in overlying relationship relative to the face is formed with a flange disposed in engaging relationship around the flange of the nut. The washer is provided with an aperture through the central portion thereof and in axial alignment with the threaded bore in the body of the nut assembly. The aperture is of a size to enable unrestricted movement of the washer over the threaded and locking sections of the male member, but upon deformation of the washer between the face of a workpiece and the face of the body, effects reduction in its size wherein the edges thereof are deformed into firm interlocking engagement with the engaging section of the male member thereby preventing inadvertent axial movement of the nut assembly outwardly along the threaded section.

Other benefits and advantages of the present invention will become apparent upon a reading of the following description taken in conjunction with the accompanying drawing.

Description of the drawing

FIGURE 1 is a fragmentary side elevational view partly in section illustrating a fastener assembly constructed in accordance with the preferred embodiments of the present invention in an installed position;

FIGURE 2 is a longitudinal sectional view of a nut assembly prior to installation comprising a preassembled unit consisting of the nut body and deformable washer affixed thereon; and FIGURE 3 is an end view of the nut assembly shown in FIGURE 2, as viewed in the direction of the arrow indicated at 3.

Description of the preferred embodiments

Referring now in detail to the drawing and as may be best seen in FIGURE 1, a pair of plates 4, 6 having aligned bores 8, 10, respectively, is retained in firm secured relationship by means of an installed fastener assembly comprising a male member 12 and a nut assembly 14. The male member 12 consists of a cylindrical shank 16 having a head 18 integrally formed on one end thereof, which overlies the outer face of the plate 4 and applies an axial clamping force thereto in opposition to the clamping force of the nut assembly threadably engaged on a threaded section 20 provided along the opposite end of the shank 16. An engaging or locking section 22, having a textured surface is disposed along the shank 16 adjacent to the threaded section 20 and extends axially along the shank for a portion of the length thereof. In accordance with the specific preferred embodiment, as illustrated in FIGURE 1, the texture along the engaging section 22 is formed by a plurality of axially spaced V-shaped grooves 24 defining therewith a plurality of V-shaped crests 26 extending around the shank in spaced substantially parallel relationship. In the exemplary embodiment illustrated, the V-shaped crests 26 are of substantially the same diameter as the crests of the threads along the threaded section 20.

The nut assembly 14, as best seen in FIGURES 2 and 3, comprises a preassembled unit consisting of a body 28 and a deformable washer 30. The body 28 is formed with a substantially planar face or seat 32, and is provided with a threaded bore 34 disposed substantially perpendicular to the face 32 which is adapted to be threadably engaged on the threaded section 20 of a male member. The body 28 is also provided with a circular flange 36 adjacent to the face 32 which is provided with a tapered peripheral surface 38 of a decreasing diameter in a direction axially away from the face 32. A counterbore 40 is provided in the body which is disposed in axial alignment with the threaded bore 34 and extends inwardly from the face 32 for a portion of the depth of the body. The counterbore 40 provides clearance between the body and the engaging section of a male member to permit deformation and flow of the washer in a manner and for the purposes subsequently to be described.

The washer 30 is of a circular configuration having a centrally disposed dish-shaped portion 42 overlying the face 32 of the nut body and disposed in axially spaced substantially parallel relationship relative thereto. The dish-shaped portion 42 is integrally connected by a conically shaped wall 44 to a radially extending wall 46 which terminates in an annular flange 48 that overlies and is disposed in sliding bearing contact against the tapered surface 38 of the flange formed on the nut body. It will be apparent from this construction that the bearing relationship of the inner surface of the radially extending wall 46 against the outer surface of the face 32 and the overlying engaging bearing relationship of the annular flange 48 against the tapered surface 38 of the nut body restricts relative axial movement of the washer and nut body with respect to each other. In addition, the conically shaped wall 44 enables deformation of the dish-shaped portion of the washer from a position as shown in FIGURE 2 to a position as shown i nFIGURE 1 in which the conically shaped wall and dish-shaped portion of the washer are disposed in compacted overlying relationship against the face 32 of the nut body.

The dish-shaped portion of the washer is also provided with an aperture 50 disposed centrally thereof which is retained in appropriate axial alignment with respect to the counterbore 40 and the threaded bore 34 of the nut body. The aperture 50 is of a size such that the inner edge thereof is disposed in clearance relationship when the washer is in a nondeformed original condition with respect to the crests of the threads along the threaded section 20 of the male member as well as the V-shaped crests 26 along the engaging section 22. This enables the nut assembly to be advanced axially along the threaded section to a position wherein the dish-shaped portion contacts the adjacent face of a member to be fastened such as the plate 6 during installation.

The fastener assembly is adapted to be supplied in various sizes and within each size range the male member 12 is available in various lengths such that the threaded section enables the nut assembly to be tightened to a position as shown in FIGURE 1 wherein the threaded bore 34 of the nut assembly is disposed on the threaded section 20 of the male member. In addition, the threaded section 20 is proportioned so as to terminate at a point spaced outwardly of the workpiece being clamped so that the engaging section 22 lies along the area adjacent to the outer face of the workpiece against which the deformed washer is engageably locked at the completion of installation.

During a fastening operation, the nut assembly is axially advanced along the threaded section of the male member such as by means of a suitable wrench or socket disposed in engagement with flat faces 52 defining a hexagonal configuration formed around the periphery of the nut body. Upon contact of the forward face of the washer 30 with the surface of the workpiece such as the plate 6, continued tightening effects a progressive deformation of the dish-shaped portion 42 from the original non-deformed configuration shown in FIGURE 2 to a substantially flat configuration as illustrated in FIGURE 1. In response to the deformation of the washer, the inner edge portion defining the aperture 50 is reduced in size wherein it is driven into interlocking engagement with the V-shaped grooves 24 and wherein any excess thereof such as indicated at 54 in FIGURE 1 flows inwardly of the counterbore 40 provided adjacent to the forward face of the nut body.

During the course of the deformation of the washer and its engagement in the locking grooves 24, the washer may become stationary due to the frictional resistance developed in which instance the nut body itself is free to rotate by virtue of the sliding fit of the face 36 and tapered surface 38 with the radial wall 46 and conically shaped annular flange 48 around the outer edge of the washer.

The tightening of the nut is continued until the conically shaped wall 44 of the washer is disposed substantially flat against the forward face 32 of the nut body. When this point is attained, a substantial increase in torque is required to effect a further tightening of the nut assembly indicating a completion of the installation. It will be appreciated that by virtue of controlling the type and thickness of the metal of which the washer 30 is composed as well as its dish-shaped configuration, a preloading can be built into the fastener assembly corresponding to that torque necessary to effect a deformation of the washer to a planar configuration. This preloading in turn serves to effect an appropriate tensioning of the shank of the male member as well as a proper clamping of the plates being fastened by the fastener assembly. The deformable nature of the nut assembly also enables a quick visual inspection of the installation to determine whether in fact that nut has been properly tightened on the male member.

With the nut assembly fully installed and with the washer thereon deformed to a configuration corresponding to that substantially as shown in FIGURE 1, inadvertent outer axial movement of the nut body is prevented by virtue of the overlying restraining characteristics of the annular flange 48 disposed in bearing contact against the tapered surface 38. The embedment of the inner edges of the washer within the V-shaped grooves along the engaging section also serves to maintain proper tensioning of the threaded male member over prolonged periods of time.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A fastener assembly comprising a male member including a shank having a threaded section adjacent to one end thereof and an engaging section having a textured surface including a plurality of indentations in said shank extending axially along said shank adjacent to said threaded section, and a nut assembly including a body having a bearing face and formed with a threaded bore including an enlarged counterbore extending inwardly of said face, said nut assembly adapted to be threadably engaged on said threaded section with a portion of said engaging section adapted to be received in said counterbore, said body formed with an external flange extending therearound, a washer of deformable material overlying said face and formed with an annular flange disposed in engaging relationship around said flange preventing relative axial movement therebetween, said washer formed with a centrally disposed deformable dish-shaped depression including a substantially radially inwardly extending portion disposed in axially spaced relationship from said face and provided with an aperture therethrough of a size wherein the periphery thereof is normally disposed in clearance relationship relative to said threaded section and said engaging section, said depression deformable between a workpiece and said face in response to axial advancement of said nut assembly along said threaded section to a substantially flattened position in deformed overlying relationship against said face and whereby the diameter of said aperture of the flatted said washer is of a reduced size wherein said periphery thereof is disposed in deformed coacting locking relationship against said textured surface of said engaging section and is partially received within said counterbore thereby restricting inadvertent axial movement of said body along said threaded section.

2. The fastener assembly as defined in claim 1, wherein said face is of a planar configuration and is disposed substantially perpendicular with respect to the axis of said threaded bore.

3. The fastener assembly as defined in claim 1, wherein said flange is of a circular configuration and is disposed adjacent to said face and wherein said washer is rotatably interlocked therearound.

4. The fastener assembly as defined in claim 1, wherein said depression of said washer is of a controlled deformable construction requiring a preselected torque to be applied to said nut assembly for effecting a deformation thereof.

5. The fastener assembly as defined in claim 1, wherein said flange is of a circular configuration having a tapered surface disposed concentrically of the axis of said threaded bore, and said annular flange of said washer is disposed in axially interlocking and rotational sliding bearing contact on said conical surface.

6. The fastener assembly as defined in claim 1, wherein said textured surface is defined by a plurality of axially spaced grooves extending along the length of said engaging section for engageably receiving the deformed said edge of said washer.

References Cited

UNITED STATES PATENTS

| | | | |
|---|---|---|---|
| 873,424 | 12/1907 | Greene | 151—3 |
| 1,801,999 | 4/1931 | Bowman | 151—3 |
| 2,432,805 | 12/1947 | Robertson | 151—30 |
| 3,220,453 | 11/1965 | Greeno | 151—7 |

FOREIGN PATENTS 109,854  10/1917  Great Britain.

CARL W. TOMLIN, *Primary Examiner.*

R. S. BRITTS, *Assistant Examiner.*

U.S. Cl. X.R.

85—62